Aug. 18, 1964  R. D. REIS  3,144,772
TEMPERATURE VARIATION TRANSMITTER
Filed June 23, 1961  2 Sheets-Sheet 2

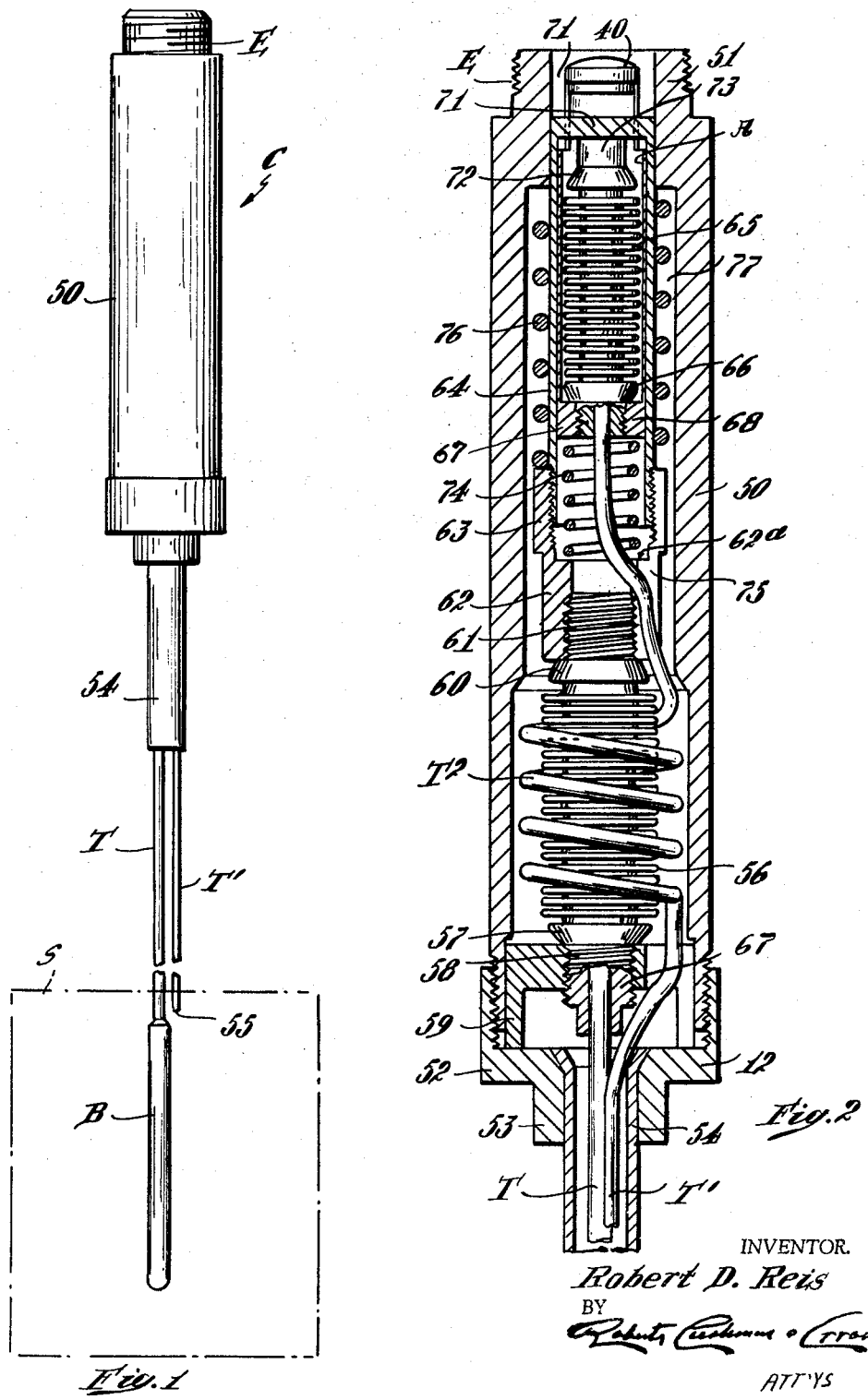

United States Patent Office 3,144,772
Patented Aug. 18, 1964

3,144,772
TEMPERATURE VARIATION TRANSMITTER
Robert D. Reis, Hingham, Mass., assignor to United Electric Controls Company, Watertown, Mass., a corporation of Massachusetts
Filed June 23, 1961, Ser. No. 119,167
5 Claims. (Cl. 73—368.7)

This invention pertains to a transmitter designed to translate variations in temperature into mechanical motion of an actuating element, for example, for operating an electrical switch and, in particular, when such variations in temperature occur at a distance exceeding twenty feet from the switch, depending upon the particular indicator involved or the degree of accuracy required, and relates more especially to a transmitter of the general type of that disclosed in the patent to Leupold, No. 2,395,007, dated February 19, 1946, wherein there is shown means for automatically making corrections for variations in the temperature of the atmosphere in the vicinity of the transmitter itself.

Since, as above noted, instruments of this type may be located at a very substantial distance (for instance, two hundred feet or more) from the place or source at which the temperature variations occur, and since the customary way of transmitting the temperature variations from said place or source to the instrument is by means of a capillary tube, filled with liquid, it has been found that when the temperature-responsive instrument is required to respond with great accuracy to temperature variations at the source, the temperature of the ambient air or other medium, through which the long capillary tube passes, may result in inaccuracies in the operation of the instrument. The existence of such inaccuracies, so occasioned, is clearly manifest when the instrument is of the recording type.

The principal object of the present invention is to provide apparatus of the above type having means for automatically compensating for errors caused by the exposure of the long capillary tube (which extends from the source of temperature variation to the recording instrument) to air or other medium whose temperature is substantially different from that at the source. A further object is to provide means operative to compensate for errors caused by changes in atmospheric temperature in the neighborhood of the instrument itself. A further object is to provide apparatus of the above type so devised as to prevent injury to the switch or other element actuatable by the transmitter in the event of exposure to temperatures substantially beyond the intended range of the instrument.

In the attainment of the above results, the present invention provides a transmitter, in general, similar to that of the above patent to Leupold, No. 2,395,007, but wherein, instead of providing compensation merely for the temperature variations in the atmosphere surrounding the instrument itself, provision is made for compensating for temperature variations in the medium through which a capillary tube extends from the instrument to a bulb at the end of the tube. Specifically, this is accomplished by providing a capillary neutralizing tube extending from said space or source of temperature variation to the transmitter, and which is filled with liquid, and which is closed at that end which is adjacent to said bulb. The opposite end of the neutralizing tube opens into a compensating bellows device, so arranged that it opposes motion of the main bellows (which normally responds to the varying temperature at the source), so that if, for example, the temperature of the air between the source and the instrument increases above a predetermined amount (whereby the column of liquid in the capillary transmitting tube is caused to expand), a corresponding increase in temperature in the column of liquid in the neutralizing tube will so actuate the compensating bellows as to insure accuracy of reading of the instrument corresponding to the temperature variations at the source and without reference to the temperature through which the transmitting tube extends.

One desirable embodiment of the present invention is described more in detail in the following specification and by reference to the accompanying drawings wherein:

FIG. 1 is an elevation, showing the transmitter of the present invention, together with the capillary transmitting tube which leads from the bulb at the place of varying temperature, and also the capillary neutralizing tube of the present invention, portions of the tubes being broken away;

FIG. 2 is an axial section, to larger scale, of the transmitter of FIG. 1, the capillary tubes being broken off;

Figure 4:
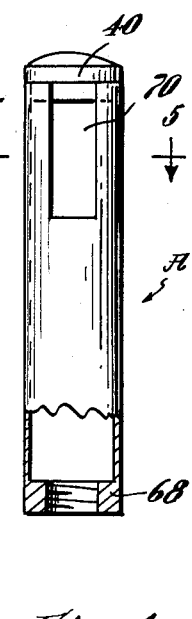
FIG. 4 is an elevation, partly in diametrical section, of the switch-actuating element of the transmitter.
Figure 8:
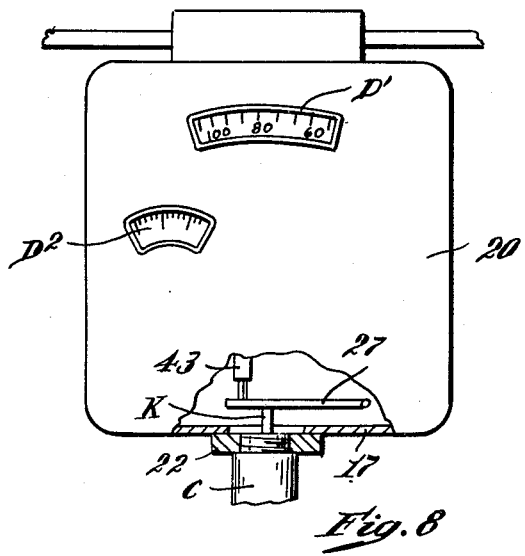
FIG. 8 is a front elevation, partly in section, showing the device of the present invention as operatively associated with an indicating instrument.

Referring to the drawings and, in particular, to FIG. 8, the present invention is shown, merely by way of example, as operatively associated with an instrument such as that more fully disclosed in the patent to Leupold, No. 2,797,272, dated June 25, 1957. This instrument, as shown in FIG. 8 has the front panel 20 and dials $D^1$ and $D^2$, and has a bottom wall 17, to the undersurface of which there is attached a slidably adjustable plate 22 which, in accordance with the present invention, is provided with a screw-threaded aperture with which the screw-threaded upper end E (FIGS. 1 and 2) of the case C of the transmitter of the present invention is engaged. In the patented instrument, there is a vertically slidable rod 43 whose upper end is arranged for contact with the actuating pin of a switch (not shown) and whose lower end rests upon a lever device 27 whose undersurface contacts a motion-transmitting element K which (although not so here shown) may constitute an integral upward extension of the actuating element A (FIGS. 2 and 4) of the transmitter of the present invention, and which is moved up or down in response to temperature changes at the source.

It is to be understood that the transmitter of the present invention is useful wherever it is desired to operate a part in response to temperature variations, and that its association with the instrument illustrated in FIG. 8 is merely by way of an example of its utility and not in limitation.

Figure 3:
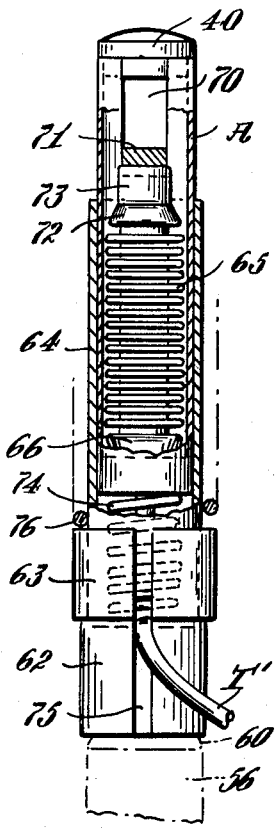
FIG. 3 is a section to smaller scale than FIG. 2, but in a plane at righ angles to the latter figure, showing only the upper part of the transmitter.

Referring to FIGS. 1, 2 and 3, the transmitter of the present invention comprises the case C, above referred to, of appropriate material, for example, metal or plastic, including an elongate, hollow cylindrical member 50 whose upper end, as shown at 51 (FIG. 2), is reduced in diameter and externally screw-threaded at E for connecting it to the device with which it is to be associated. At its lower end the member 50 is also externally screw-threaded for engagement with screw threads formed at the interior of the bottom closure cap 52, this cap having a downwardly directed tubular stem portion 53 designed to receive the end of a protective tube or casing 54, which may be rigid or flexible as desired, and which provides protection for the capillary transmitting tube T which extends from the transmitter to the place S (hereafter, for convenience, referred to as the "source"), where the temperature variations to be indicated or recorded occur, and where the tube T ends in a bulb B (FIG. 1). The casing 54 also provides protection for the capillary neutralizing tube $T^1$ (FIGS. 1 and 2) which is desirably closely adjacent and parallel to the tube T and which is simply closed at its extremity as shown at 55 (FIG. 1). The casing 54 for protecting these capillary tubes may extend the entire lengths of the tubes or be confined to those situations wherein injury to the tubes is most to be expected.

Figure 7:
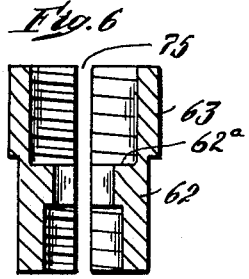
FIG. 7 is a diametrical section of the lower member of said housing.
Figure 5:
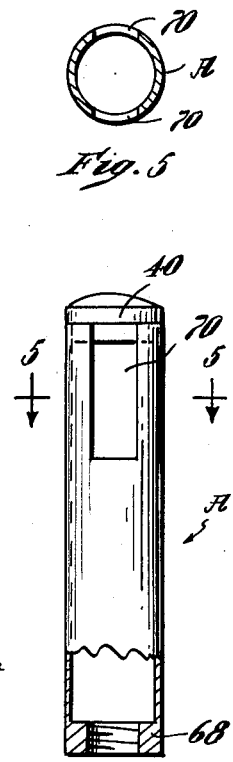
FIG. 5 is a section, on the line 5—5 of FIG. 4.

Within the lower part of the case C, there is arranged the main pressure motor, here shown as comprising a metallic bellows 56 of conventional type, whose lower, stationary head 57 has a downwardly extending, peripherally screw-threaded boss 58 which engages a screw-threaded opening in the bottom of an inverted, cup-like support 59 whose lower edges rest upon the upper surface of the closure cap 52. The end of the capillary transmitting tube T extends up through the support 59 and into an axial bore in the boss 58, being welded or otherwise secured to said boss to provide a leak-tight connection. The upper or movable head 60 of the bellows 56 has an externally screw-threaded stem portion 61 which engages an internally screw-threaded bore (FIG. 7) in the cylindrical lower member 62 of the housing for the compensating bellows 65.

The member 62 has an upper portion 63 of larger diameter, which is internally screw-threaded for engagement with the cylindrical upper member or sleeve 64 of the housing for the compensating bellows 65. This bellows is of conventional type, having the lower head 66 provided with an externally screw-threaded stem 67 which engages a threaded bore in the lower end 68 (FIGS. 2 and 4) of the tubular actuator A (FIGS. 2, 3, 4 and 5), arranged to slide within the member 64 and which has a closure member 40 at its upper end constituting the actuating element or button which is to be moved in response to temperature variations.

A coiled compression spring 76 is housed within the space 77 surrounding the sleeve 64 and bears against the upper edge of the part 63 so as to urge the sleeve member 64 downwardly, and thus maintain a normal load upon the bellows 56.

Figure 6:
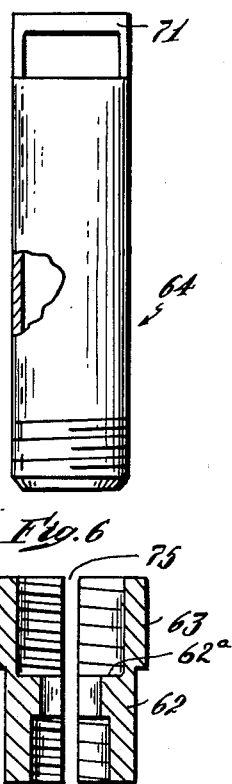
FIG. 6 is an elevation, partly broken away, of the upper member of the housing for the compensating bellows.

The part A is tubular but provided, in its upper portion at opposite sides, with elongate windows 70 (FIG. 5) for the passage of a transverse bridge member 71 (FIGS. 2, 3 and 6) extending across the upper end of the tubular outer sleeve 64. The upper head 72 of the compensating bellows 65 is provided with an upwardly directed stem portion 73 which bears against the undersurface of the bridge member 71. A coil compression spring 74 bears, at its lower end, against a shoulder 62a (FIGS. 2 and 7) of the part 62, and at its upper end against the lower end 68 (FIGS. 2 and 4) of the actuator A, this spring thus tending to push the actuator A upwardly and thus to maintain the distance between the upper surface of the actuating button 40 and the lower head 57 of the main bellows 56 at a maximum. Assuming that the device has been installed for use and that the actuating element or button 40 is operatively associated with the switch-actuating pin of a snap-action switch, then, in response to increase in temperature at the bulb B within a normal range, the bellows 56 will move the assembly, comprising the parts 62, 63, 64; the spring 74; and the inner telescopic member A with its switch-actuating button 40, upwardly, so as to actuate the switch. However, if the temperature were to rise abnormally, so that the switch might otherwise be damaged, the spring 74 (through which the motion of part 62 is transmitted to the inner tubular member A and thus to the button 40) will yield before the switch is damaged.

The capillary neutralizing tube $T^1$, which may be of somewhat smaller diameter than the capillary transmitting tube T to facilitate assembly and a permissive smaller outside diameter of case C, extends upwardly through the bottom cap 52 of the case C and through a slot in part 59 and preferably forms a coil $T^2$ about the bellows 56, and then extends upwardly through a slot 75 (FIGS. 2 and 7) in the part 62 and into the space in which the spring 74 is housed and then up through the stem of the bellows head 66 so as to communicate with the interior of the bellows 65. The coil $T^2$, being longitudinally extensible, permits motion of the bellows head 75 in response to variations in fluid-pressure within bellows 65.

It will be understood that both of the capillary tubes T and $T^1$ and the associated bellows devices 56 and 65, will be completely filled with liquid so that as the temperature at the source S increases, the bellows 56 will expand and thus push the assembly, comprising the parts 62 and 64, and the inner sleeve or actuator A, upwardly so that the actuating element or button 40 will correspondingly move the member K and the lever 27 (FIG. 8), or other movable part which is to be actuated by the transmitter of the present invention.

Because the neutralizing tube $T^1$ extends from the source S to the transmitter, the liquid contained within this tube will be subject to thermal expansion as well as that within the tube T, in response to temperature changes in the ambient medium through which the capillary tubes pass on their way from the source to the transmitter. If, in the absence of compensating means functioning like that herein disclosed, the temperature in such ambient medium, through which the tube T passes, should exceed that at the source, the bellows 56 would be caused to expand abnormally so that the temperature indicated or recorded at the instrument with which the transmitter is associated, would be incorrect as showing a temperature exceeding that at the source. In the same way, if the tube T passed through a medium whose temperature were below that at the source, the liquid in the capillary tube would be cooled and thus the indicated temperature would be abnormally low.

However, in accordance with the present invention, since the capillary tube $T^1$ is subject to the same temperature variations as the tube T, and since the increase in temperature of the liquid in the tube $T^1$ results in expanding the bellows 65, and since expansion of this bellows has the effect of moving the part 40, which telescopes within the part 64, downwardly, whereas the bellows 56 tends to move it upwardly, the action of the tube $T^1$ and bellows 65 is to compensate for errors resultant from the temperature of the ambient medium through which the capillary tube T passes.

The coil $T^2$ assists the bellows 65 in providing compensation for changes in the ambient temperature immediately surrounding the case C of the transmitter, so that, by the present invention, accuracy in reading is assured regardless of temperature variations in the immediate vicinity of the instrument or of the temperature of the medium through which the capillary tube T passes on its way from the place at which the bulb B is situated.

The liquid which fills the neutralizing tube, comprising the parts $T^1$ and $T^2$ and the bellows 65, may or may not be like that which fills the bulb B, the tube T and the bellows 56. Merely by way of example desirable results have been obtained when the bellows 65 and the neutralizing tube comprising the parts $T^1$ and $T^2$ were filled with turpentine while the bulb B, tube T and bellows 56 were filled with toluol.

The essential relation, to insure the desired results, may be expressed as follows:

$$M = M' = \frac{V\beta}{A} = \frac{V'\beta'}{A'}$$

where $M$ = movement per degree of bellows 56
$M'$ = movement per degree of bellows 65
$A$ = effective area of bellows 56
$A'$ = effective area of bellows 65
$\beta$ = coefficient of thermal expansion of the contents of bellows 65 and capillary tube T
$\beta'$ = coefficient of thermal expansion of the contents of bellows 65 and capillary tube $T^1$, $T^2$ For compensation for temperature variation in the immediate vicinity of the case C:

$V$ = volume of liquid in bellows 56
$V'$ = volume of liquid in bellows 65 and capillary tube $T^2$ For compensation for temperature variation in the space through which the tubes $T^1$ and $T^2$ pass:

$V$ = per unit volume of liquid in capillary tube T
$V'$ = per unit volume of liquid in capillary tube $T^1$ While one desirable embodiment of the invention has herein been disclosed by way of example, it is to be understood that the invention is broadly inclusive of any and all modifications falling within the scope of the appended claims.

I claim:

1. In a transmitter for translating variations in temperature into mechanical motion of an actuating element, said transmitter being of the kind which comprises a casing which houses a main motor comprising a metallic bellows having a movable upper end wall, a capillary transmitting tube connecting the interior of said bellows with a bulb located at a distant source at which temperature variations occur, said bulb, tube and bellows being filled with a liquid, a compensator comprising a pair of rigid, coaxial, telescopic tubular elements, the inner one of said elements having a closure at its lower end, a compression spring bearing at one end against the underside of said closure and at its other end against an abutment at the lower end of the outer tubular element, the upper end of the outer tubular element having a bridge member which extends transversely of the axis of the inner tubular element, said latter tubular element having longitudinally extending slots for the passage of said bridge member so arranged that the inner element may move axially a limited distance relative to said outer tubular element, an actuating button at the upper end of said inner element, a compensating metallic bellows housed within the inner tubular element, the upper end of the latter bellows engaging said transverse bridge member and the lower end engaging the closure at the lower end of the inner tubular element, in combination, a capillary neutralizing tube having one end open into the interior of the compensating bellows and its other end closed, the compensating bellows and said neutralizing tube being filled with liquid, said neutralizing tube extending from the transmitter, in close adjacency to the aforesaid capillary transmitting tube, substantially to said source where the temperature variations take place, the component parts of the transmitter being so constructed and arranged that variation in length of the compensating bellows, in response to the temperature of the ambient medium through which the capillary tubes pass on their way from the source to the transmitter, results in an inverse variation in the overall length of the compensator.

2. In a transmitter for translating variations in temperature into mechanical motion of an actuating element, said transmitter being of the kind which includes a main pressure motor comprising a metallic bellows having a movable wall, a capillary transmitting tube connecting said bellows with a bulb located at a distant point at which variations in temperature occur, the bellows, tube and bulb being completely filled with liquid, a tubular casing of variable length, a spring which tends to hold one end of said casing in contact with the movable wall of the bellows, the upper end of said tubular casing constituting an actuating element, in combination, compensating means including a capillary neutralizing tube which extends from said point at which the temperature variations occur to said casing, said tube being closed at that end which is remote from the casing and being filled with liquid, and a temperature-responsive device, within said tubular casing, with which said neutralizing tube communicates, the component parts of the transmitter being so constructed and arranged that the length of said tubular casing varies inversely with changes in the temperature of the ambient medium through which the capillary tubes pass from said distance point to the transmitter.

3. A transmitter according to claim 2, further characterized in that the neutralizing tube comprises a coil surrounding the bellows of the main motor.

4. In a transmitter for translating variations in temperature into mechanical motion of an actuating element, a first hollow cylindrical part, a first pressure-operable motor mounted within said first hollow cylindrical part with one end fixed adjacent the one end of said first hollow cylindrical part and the other end movable relative to the one end axially within the first hollow cylindrical part, a first conductor tube connected at one end to said first pressure-operable motor, said first conductor tube being of sufficient length to extend from the transmitter to a place remote therefrom, the temperature of which is to be measured, a bulb at the remote end of said first conductor tube, a second hollow cylindrical part slidably supported within said first hollow cylindrical part with one end secured to the movable end of said first pressure-operable motor, a first coiled spring surrounding said second hollow cylindrical part yieldably opposing axial movement of said second hollow cylindrical part by expansion of said first pressure-operable motor, a second pressure-operable motor mounted in said second hollow cylindrical part with one end abutting a fixed part at the other end of said second cylindrical part, a second spring disposed in said second hollow cylindrical part with its ends engaged, respectively, with a fixed part of said second hollow cylindrical part, and the other end of said second pressure-operable motor opposing expansion of said second pressure-operable motor, a tube extending from said second pressure-operable motor, from said second hollow cylindrical part into said first hollow cylindrical part, and from said first hollow cylindrical part through the end adjacent said first conductor tube, and means at the end of the second hollow cylindrical part differentially movable by expansion and contraction of said first and second pressure-operable motors relative to said first hollow cylindrical part, said last-named means constituting an actuating element.

5. A transmitter according to claim 4, wherein the last-named means is a button at the end of a third hollow cylinder situated within said second hollow cylindrical part and movable axially therein, one end of which constitutes the button and the other end of which is engaged at one side by said second pressure-operable motor and the other side of which is engaged by said second spring.

References Cited in the file of this patent

UNITED STATES PATENTS

| | | |
|---|---|---|
| 1,935,118 | Giesler | Nov. 14, 1933 |
| 2,053,974 | Smith | Sept. 8, 1936 |
| 2,427,900 | Camilli et al. | Sept. 23, 1947 |
| 2,736,501 | Widell | Feb. 28, 1956 |

FOREIGN PATENTS

| | | |
|---|---|---|
| 833,696 | Great Britain | Apr. 27, 1960 |